W. E. MUNTZ.
TAP OR VALVE.
APPLICATION FILED JAN. 21, 1915.
1,294,692.
Patented Feb. 18, 1919.
2 SHEETS—SHEET 2.
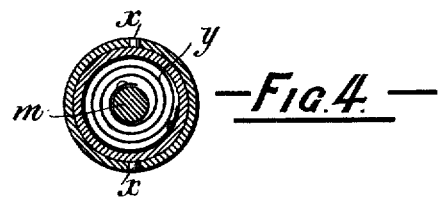
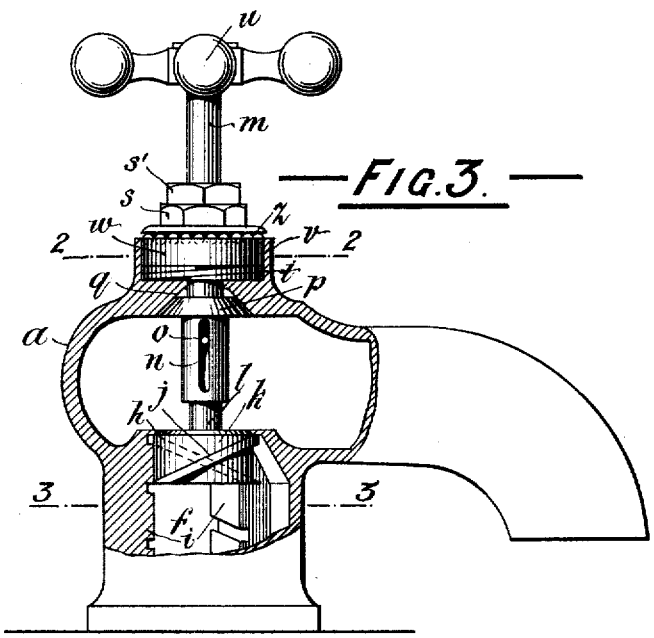
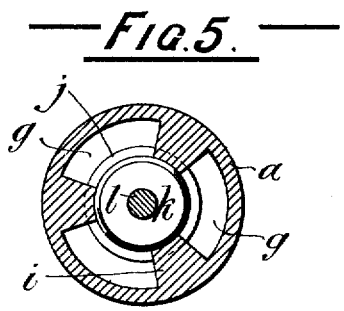
Witnesses:—
Hyperion Barry.
F. George Barry
Inventor.
William Edgar Muntz
by attorneys

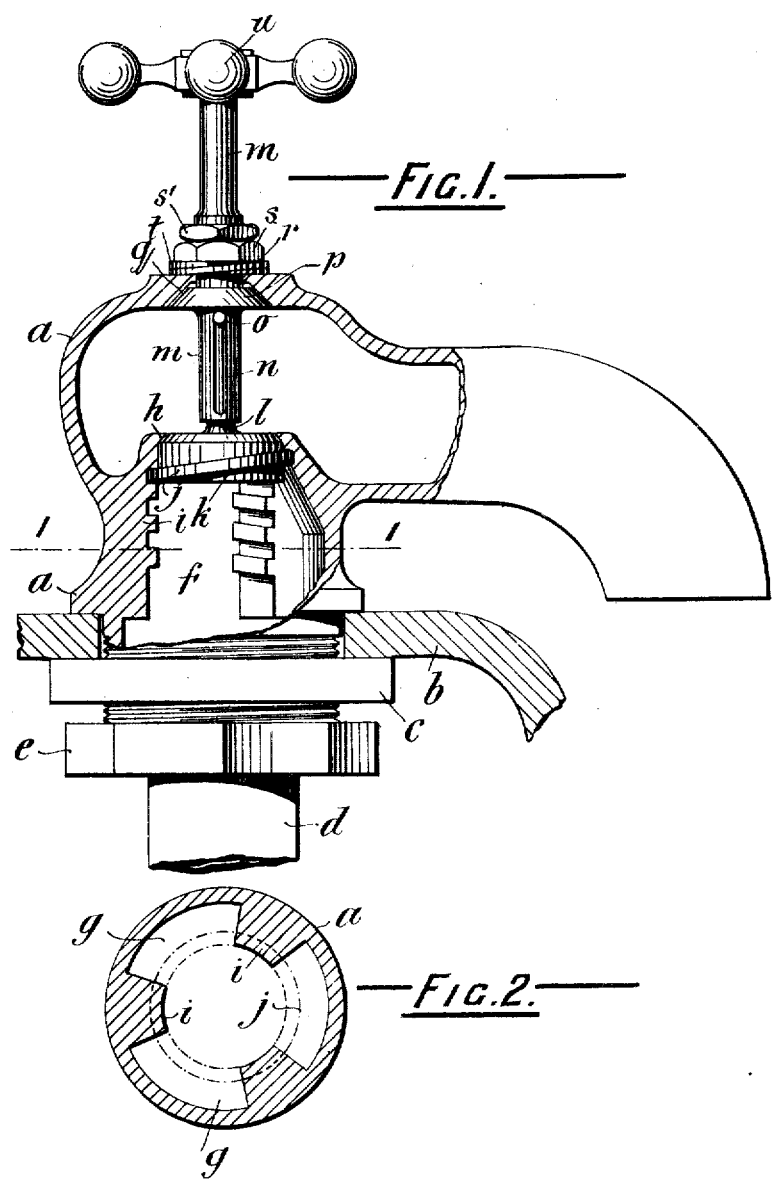

UNITED STATES PATENT OFFICE.

WILLIAM EDGAR MUNTZ, OF LONDON, ENGLAND.

TAP OR VALVE.

1,294,692.  Specification of Letters Patent.  Patented Feb. 18, 1919.

Application filed January 21, 1915. Serial No. 3,652.

*To all whom it may concern:*

Be it known that I, WILLIAM EDGAR MUNTZ, a subject of the King of Great Britain, and resident of London, England, have invented new and useful Improvements in Taps or Valves, of which the following is a specification.

The present invention is an improvement in or modification of a tap or valve of the kind which comprises a casing wherein are one or more grooves of varying sectional area, a plug capable of endway movement over the said grooves and means consisting of a spindle which by its rotation effects the movement of the said plug to uncover more or less of the grooves or completely close the same by forcing the said plug against a fixed conical seating.

I have illustrated my improvements in the accompanying drawings a bath tap being selected for illustration.

Figure 1 is a sectional side elevation.

Fig. 2 is a section on line 1—1 of Fig. 1.

Fig. 3 is a sectional elevation of a slightly varied form of tap.

Fig. 4 is a section on line 2—2 of Fig. 3 and

Fig. 5 is a section on line 3—3 of Fig. 3.

Referring to Figs. 1 and 2:—$a$ is the body of the tap inserted in a hole in the flange $b$ of the bath and secured by a nut $c$. $d$ is the water pipe united to the tap by means of a union $e$.

Within the tap is a space $f$ furnished with grooves $g$, of which three are shown, but there may be more or less if preferred. These grooves $g$ which form the passage way are wedge-like in depth, (or otherwise of varying sectional area) largest near the water inlet and gradually diminishing toward the outlet until they terminate in a conical overhang $h$. The ribs $i$ between the grooves $g$ are tapped to receive a screw thread $j$ on the outside of a cylindrical plug or rotatable plunger $k$. This plug $k$ when rotated winds itself up and down by means of its thread engaging a corresponding thread in ribs $i$. In the position shown the plug is at its highest point with its beveled edge in contact with the conical overhang $h$. In this position the tap is entirely closed, but on rotating the plug in the proper direction *i. e.* clockwise the tap is gradually opened by uncovering the grooves $g$ beginning with the shallowest part thus permitting an accurately regulated supply.

The rotation of the plug is effected by means of what may be called a claw coupling. The stem $l$ telescopes into the hollow end of a spindle $m$ and in the sides of the latter is a slot $n$ through which is introduced into the stem $l$, a pin $o$ by means of which pin $o$ rotation may be imparted to the stem $l$ from the spindle $m$ without interfering with the up and down movement of the plug $k$ within the limits of the length of the slot $n$. By this construction the claw coupling has side play in the direction of its rotation.

The spindle $m$ carries a cone or coned boss $p$ which accurately fits a ground out seating $q$ in the hole $r$ in the casing through which hole passes the outer end of the spindle $m$. The cone $p$ is kept tight to its seating by means of the spring washer $t$ and lock nuts $s\ s^1$. $u$ is a detachable handle fixed to the end of the spindle $m$.

The conical arrangement just described enables the usual "stuffing box" or "gland" to be dispensed with and yet permits the spindle of the tap to be freely turned.

I may here remark that the accurate seating of the cone $p$ in its hole $r$ simultaneously with the accurate seating of the conical end or nose of the plug to produce a perfect cut off if incidentally provided for by the flexibility of the spindle furnished by dividing the same intermediate of the plug and the cone.

In the arrangement shown in Fig. 1 the turning of the plug to open or close the tap is effected by hand both ways. In the arrangement shown in Fig. 3 however a spring is provided for turning the plug backward thereby closing the tap automatically.

The tap shown in Fig. 3 is identical with that shown in Fig. 1 with the exception that within a hollow extension $v$ provided on the top of the casing there is, between the spring washer $t$ and the lock nuts $s\ s^1$, a box $w$ preferably cylindrical. This box, which is prevented from rotating by means of projection $x$ on it engaging with the walls of the hollow extension $v$, contains a coiled spring $y$ attached at one end to the spindle $m$ and at the other end to the box. The projections $x$ fit into corresponding vertical grooves in the walls of the hollow extension $v$, such vertical grooves allowing a give and take movement of spindle $m$ due to the spring washer $t$. The arrangement is such that when the handle is turned to open the tap the tendency of the spring is to turn it back again so as to close the tap automatically. 2 is an antifriction ball bearing to enable spring and spindle to operate freely. With the object of steadying the plug the thread on the said plug may be made double instead of single as shown in Fig. 1, so that in any of its positions a length of thread around the plug shall always be engaged in the female thread on the ribs.

It is obvious that instead of a spring of the clock spring type which is illustrated, any other spring device actuating on a plane at right angles to the length of the spindle may be used.

It is obvious that taps and valves for various uses may be constructed after the manner above described. They have the great advantage of not requiring renewable washers and are without the stuffing boxes in general use in taps. Absolute control of the regulation of the passage area is provided for with a perfect closure when required.

What I claim and desire to secure by Letters Patent of the United States is:—

1. A tap or valve comprising a casing having an orifice therein, an operating spindle extending into the casing, a seat within the casing at the point of entry of said spindle into the casing, a coned boss on said spindle ground into said seat and adapted to permanently rest on said seat to hermetically seal the casing at this point with a metal to metal contact, a rotatable plunger having a ground-in conical nose and a stem extending upwardly therefrom, a seat in the casing for the ground-in conical nose of the plunger, the said spindle coöperating with said stem to form a claw coupling having sufficient side play in the direction of its rotation to allow the conical nose of the plunger under the influence of the operating spindle to form a metal to metal hermetic seal with its said seat.

2. A tap or valve comprising an exterior casing having an inlet orifice at one end and an outlet orifice at the other end, a dividing wall in the casing between the orifices, a coned circular orifice in the said wall, grooves, forming ribs between them, in the interior of the wall of the casing, which grooves are of varying sectional area starting from the larger circumference of the coned orifice where their depth is zero and gradually increasing as they extend toward the inlet orifice, an externally threaded plug complementarily engaging the said ribs, a coned nose on one end of said plug adapted to be seated in the coned orifice in the said dividing wall, a stem on said plug, a spindle within the casing, one end of which spindle, in permanent engagement with the said stem, forms therewith a loose telescopic claw coupling having adequate side play and the other end of said spindle terminating in a detachable handle without the casing, a coned boss on said spindle intermediate the coupling and the handle, the larger end of which boss is toward the coupling, and a coned recess in the interior of the casing located around the opening through which the spindle passes from the interior to the exterior of the casing and into which the coned boss is ground.

3. A tap or valve comprising an exterior casing having an inlet orifice at one end and an outlet orifice at the other end, a dividing wall in the casing between the orifices, a coned circular orifice in the said wall, grooves, forming ribs between them, in the interior wall of the casing, which grooves are of varying sectional area starting from the larger circumference of the coned orifice where their depth is zero and gradually increasing as they extend toward the inlet orifice, an externally threaded plug complementarily engaging the said ribs, a coned nose on one end of said plug adapted to be seated in the coned orifice in the said dividing wall, a stem on said plug, a spindle within the casing, one end of which spindle, in permanent engagement with the said stem, forms therewith a loose telescopic claw coupling having adequate side play and the other end of said spindle terminating in a detachable handle without the casing, a coned boss on said spindle intermediate the coupling and the handle, the larger end of which boss is toward the coupling, a coned recess within the casing located around the opening through which the spindle passes from the interior to the exterior of the casing and into which the coned boss is ground, and means for holding the coned boss to its seat comprising lock nuts on the spindle and a spiral spring around the spindle on the exterior of the casing, one end of which abuts against the said nuts and the other end against the casing.

4. A tap or valve comprising a casing having an inlet orifice and an outlet orifice and an interior dividing wall, a rotatable spindle actuated from the exterior of the casing and provided within the casing with a boss coned in the direction of the pressure of the confined fluid, a coöperating coned recess within the casing at the point of entry of the spindle, into which the coned boss is ground so as to form a permanent seal with a hermetic metal to metal contact, a rotatable plug having a conical nose pointing in the direction of the pressure of the confined fluid and external screw-threads for engaging corresponding threads on the interior of the casing, a ground-out coned orifice through the dividing wall of the casing adapted to seat the nose of the plug to form a hermetic metal to metal seal, a stem rigidly connected with the conical nose of the plug, the said spindle and the said stem coöperating to form a telescopic claw coupling having considerable side play, whereby the rotary motion of the operating spindle causes a rotary and reciprocating motion of the plug and means for automatically closing the tap comprising a return spring and a spring to hold the coned boss to its seat, the said springs operating in planes approximately at right angles to each other and their central axes coinciding with the central axis of the said coned boss and the spindle.

5. In taps or valves, a casing having grooves in the wall of its passageway of varying sectional area, the shallow ends of the grooves forming a valve seat, an operating spindle, a rotatable ground-in cone adapted to hermetically seal said casing on a metal to metal contact at the point of entry of said spindle and a second spindle connected with said operating spindle through a telescopic claw coupling, the second spindle carrying a plunger with a conical shaped nose which by a rotary and reciprocating screwed-in motion is adapted to gradually uncover or cover the said grooves and to hermetically seal said passageway by a metal to metal contact with the vlve seat.

6. In taps or valves, the combination of a casing, a cylindrical rotating plunger with a conical nose within the casing, a groove of varying sectional area in the wall of the passageway in the casing, a conical seating or overhang at the shallow end of the groove, the said conical nose of the plunger being adapted to form with the conical seating a hermetic metal to metal seal with a screwed-in-action of the plunger at the moment of seating and means for automatically closing the tap, which means includes a rotary spindle carrying a cone, a seat for said cone, a return spring, and a spring to hold the cone to its seat, the said springs operating entirely independently each of the other in planes at right angles to each other and their central axes coinciding with the central axis of the said cone and spindle.

7. In taps or valves, the combination of a casing, a cylindrical rotating plunger with a conical nose within the casing, a groove of varying sectional area in the wall of the passageway in the casing, a conical seating or overhang at the shallow end of the groove, the said conical nose of the plunger being adapted to form with the conical seating a hermetic metal to metal seal with a screwed-in-action of the plunger at the moment of seating and means for automatically closing the tap, which means includes a rotatable spindle hermetically sealed within the casing by means of a ground-in cone, a return spring and a spring to hold the cone to its seat, the said springs operating entirely independently each of the other in planes at right angles to each other and their central axes coinciding with the central axis of the said cone and spindle and an antifriction ball bearing to facilitate the rotation of said spring and spindle.

In testimony whereof I have signed my name to this specification in the presence of two subscribing witnesses.

WILLIAM EDGAR MUNTZ.

Witnesses:
P. A. NEWTON,
A. D. DINSDALE.